(12) United States Patent
Jha

(10) Patent No.: US 12,341,642 B2
(45) Date of Patent: Jun. 24, 2025

(54) FLEXIBLE CARRIER BANDWIDTH HANDLING IN WIRELESS COMMUNICATIONS SYSTEMS

(71) Applicant: Rakuten Symphony, Inc., Tokyo (JP)

(72) Inventor: Vivek Jha, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/924,017

(22) PCT Filed: Oct. 18, 2022

(86) PCT No.: PCT/US2022/078292
§ 371 (c)(1),
(2) Date: Nov. 8, 2022

(87) PCT Pub. No.: WO2024/085897
PCT Pub. Date: Apr. 25, 2024

(65) Prior Publication Data
US 2024/0223426 A1 Jul. 4, 2024

(51) Int. Cl.
*H04L 27/26* (2006.01)
(52) U.S. Cl.
CPC ...... *H04L 27/2628* (2013.01); *H04L 27/2613* (2013.01)
(58) Field of Classification Search
CPC ............. H04L 27/2613; H04L 27/2628; H04L 5/0044
See application file for complete search history.

(56) References Cited

U.S. PATENT DOCUMENTS

| | | | |
|---|---|---|---|
| 2013/0064203 A1 | 3/2013 | Ogawa | |
| 2017/0317704 A1* | 11/2017 | Noh | H04B 7/10 |
| 2018/0013591 A1 | 1/2018 | Shafiee et al. | |
| 2018/0331781 A1 | 11/2018 | Welin et al. | |

(Continued)

OTHER PUBLICATIONS

3GPP TS 36.101, Technical Specification Group Radio Access Network; Evolved Universal Terrestrial Radio Access (E-UTRA): User Equipment (UE) radio transmission and reception (Release 17), Jun. 2022.

(Continued)

*Primary Examiner* — Asad M Nawaz
*Assistant Examiner* — Natali Pascual Peguero
(74) *Attorney, Agent, or Firm* — Sughrue Mion, PLLC

(57) ABSTRACT

In general, the current subject matter relates to flexible carrier bandwidth handling in wireless communications systems. In some implementations, a first signal at a first one of a plurality of fixed operating bandwidths defined for a cellular network and a second signal at a second one of the plurality of fixed operating bandwidths defined for the cellular network can be received at a first communication device in the cellular network from a second communication device in the cellular network. The first and second signals can have a subcarrier overlap, the first and second signals can each include at least one null subcarrier value and at least one non-null subcarrier value. The first and second signals can be combined into a single signal that does not include the at least one null subcarrier values of the first and second signals.

18 Claims, 15 Drawing Sheets

(56) References Cited

U.S. PATENT DOCUMENTS

2020/0127877 A1     4/2020    Aio et al.

OTHER PUBLICATIONS

3GPP TS 36.211, Technical Specification Group Radio Access Network; Evolved Universal Terrestrial Radio Access (E-UTRA): Physical channels and modulation (Release 17), Jun. 2022.

3GPP TS 38.101-1, Technical Specification Group Radio Access Network; NR; User Equipment (UE) radio transmission and reception; Part 1: Range 1 Standalone (Release 17), Jun. 2022.

3GPP TS 38.101-2, Technical Specification Group Radio Access Network; NR; User Equipment (UE) radio transmission and reception; Part 2: Range 2 Standalone (Release 17), Jun. 2022.

3GPP TS 38.101-3, Technical Specification Group Radio Access Network; NR; User Equipment (UE) radio transmission and reception; Part 3: Range 1 and Range 2 Interworking operation with other radios (Release 17), Jun. 2022.

3GPP TS 38.101-4, Technical Specification Group Radio Access Network; NR; User Equipment (UE) radio transmission and reception; Part 4: Performance Requirements (Release 17), Jun. 2022.

3GPP TS 38.101-5, Technical Specification Group Radio Access Network; NR; User Equipment (UE) radio transmission and reception; Part 5: Satellite access Radio Frequency (RF) and performance requirements (Release 17), Jun. 2022.

3GPP TS 38.211, Technical Specification Group Radio Access Network; NR; Physical channels and modulation (Release 17), Sep. 2022.

O-RAN Working Group 4 (Open Fronthaul Interfaces WG), Control, User and Synchronization Plane Specification, Mar. 31, 2022.

O-RAN Working Group 4 (Open Fronthaul Interfaces WG), Management Plane Specification, Apr. 18, 2022.

International Search Report and Written Opinion for Intl. Pat. App. No. PCT/US22/78292 mailed Jan. 26, 2023.

\* cited by examiner

FLEXIBLE CARRIER BANDWIDTH HANDLING IN WIRELESS COMMUNICATIONS SYSTEMS

CROSS-REFERENCE TO RELATED APPLICATIONS

The present application claims priority to and is the 35 U.S.C. 371 United States National Phase application based on International Patent Application No. PCT/US22/78292, filed on Oct. 18, 2022, entitled "FLEXIBLE CARRIER BANDWIDTH HANDLING IN WIRELESS COMMUNICATIONS SYSTEMS," which is hereby incorporated by reference in its entirety.

TECHNICAL FIELD

In some implementations, the current subject matter relates to telecommunications systems, and in particular, to flexible carrier bandwidth handling in wireless communications systems.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile: in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G New Radio ("NR") are evolutions of earlier generation 3GPP technologies like the GSM/EDGE and UMTS/HSPA digital cellular technologies and allows for increasing capacity and speed by using a different radio interface together with core network improvements.

Cellular networks can be divided into radio access networks and core networks. The radio access network (RAN) can include network functions that can handle radio layer communications processing. The core network can include network functions that can handle higher layer communications, e.g., internet protocol (IP), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., MAC, RLC, etc.

LTE wireless communication systems use frequency bands that support channel bandwidths specified in the 3GPP Standard (3GPP TS 36.101): 1.4 MHZ, 3 MHZ, 5 MHz, 10 MHz, 15 MHZ, and 20 MHz. 5G NR wireless communication systems also use frequency bands that support channel bandwidths specified in the 3GPP Standard (3GPP TS 38.101): 5 MHz, 10 MHz, 15 MHZ, 20 MHZ, 25 MHZ, 30 MHZ, 35 MHz, 40 MHz, 45 MHZ, 50 MHz, 60 MHz, 70 MHZ, 80 MHz, 90 MHz, and 100 MHz. Spectrum bandwidth released from legacy networks (e.g., 2G LTE and 3G LTE) is available bandwidth for LTE or NR wireless communications systems. However, released bandwidths may not be among the defined fixed operating channel bandwidths and can thus be unused and a wasted available resource.

SUMMARY

In some implementations, the current subject matter relates to a computer-implemented method. The method may include receiving, at a first communication device in a cellular network from a second communication device in the cellular network, a first signal at a first one of a plurality of fixed operating bandwidths defined for the cellular network and a second signal at a second one of the plurality of fixed operating bandwidths defined for the cellular network. The first and second signals may have a subcarrier overlap, the first signal may include at least one null subcarrier value and at least one non-null subcarrier value, and the second signal may include at least one null subcarrier value and at least one non-null subcarrier value. The method may also include combining the first and second signals into a single signal that does not include the at least one null subcarrier value of the first signal and does not include the at least one null subcarrier value of the second signal.

In some implementations, the current subject matter can include one or more of the following optional features.

In some implementations, the at least one null subcarrier value of the first signal may follow the at least one non-null subcarrier value of the first signal, the at least one null subcarrier value of the second signal can lead the at least one non-null subcarrier value of the second signal, and combining the first and second signals into the single signal may include using the at least one non-null subcarrier value of the first signal as leading subcarrier values of the single signal and using the at least one non-null subcarrier value of the second signal as trailing subcarrier values of the single signal that trail all of the leading subcarrier values.

In some implementations, an error state may occur when the at least one null subcarrier value of the first signal leads the at least one non-null subcarrier value of the first signal and the at least one non-null subcarrier value of the second signal leads the at least one null subcarrier value of the second signal.

In some implementations, the at least one non-null subcarrier value of the first signal may overlap the at least one null subcarrier value of the second signal, and the at least one non-null subcarrier value of the second signal may overlap the at least one null subcarrier value of the first signal.

In some implementations, the method may further include, after combining the first and second signals into the single signal, applying inverse fast Fourier transform ("IFFT") processing or fast Fourier transform ("FFT") processing to the single signal.

In some implementations, the method may further include, before combining the first and second signals into the single signal: applying IFFT processing or FFT processing to the first signal, and applying IFFT processing or FFT processing to the second signal.

In some implementations, the single signal may reflect a bandwidth that is not one of the plurality of fixed operating bandwidths defined for the cellular network.

In some implementations, the method may further include performing a handshake between the first and second communication devices that establishes an understanding that the combining will be later performed.

In some implementations, the method may further include detecting the subcarrier overlap using digital domain IQ data transmitted in a frequency domain of each of the first and second signals and using symbol duration transmitted in a time domain of each of the first and second signals, and the detecting may facilitate the combining of the first and second signals into the single signal.

In some implementations, one of the first and second communication devices may include a distributed unit, and the other of the first and second communication devices may include a radio unit. Further, the first communication device that receives the first and second signals may include the distributed unit and the second communication device may include the radio unit such the communication is uplink communication, or the first communication device that receives the first and second signals may include the radio unit and the second communication device may include the distributed unit such that the communication is downlink communication. Further, the first communication device may perform the combining.

In some implementations, the cellular network may be a 3GPP LTE network. Further, the single signal may reflect a bandwidth that is not one of the plurality of fixed operating bandwidths defined for the network.

In some implementations, the cellular network may be a 5G network. Further, the single signal may reflect a bandwidth that is not one of the plurality of fixed operating bandwidths defined for the network.

In some implementations, the first one of the plurality of fixed operating bandwidths and the second one of the plurality of fixed operating bandwidths can be different from one another.

In some implementations, the first one of the plurality of fixed operating bandwidths and the second one of the plurality of fixed operating bandwidths can be the same as each other.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a:

FIG. 1c illustrates additional detail of the evolved packet core of the exemplary LTE system shown in FIG. 1a;

FIG. 1d illustrates an exemplary evolved Node B of the exemplary LTE system shown in FIG. 1a:

DETAILED DESCRIPTION

Figure 1A:
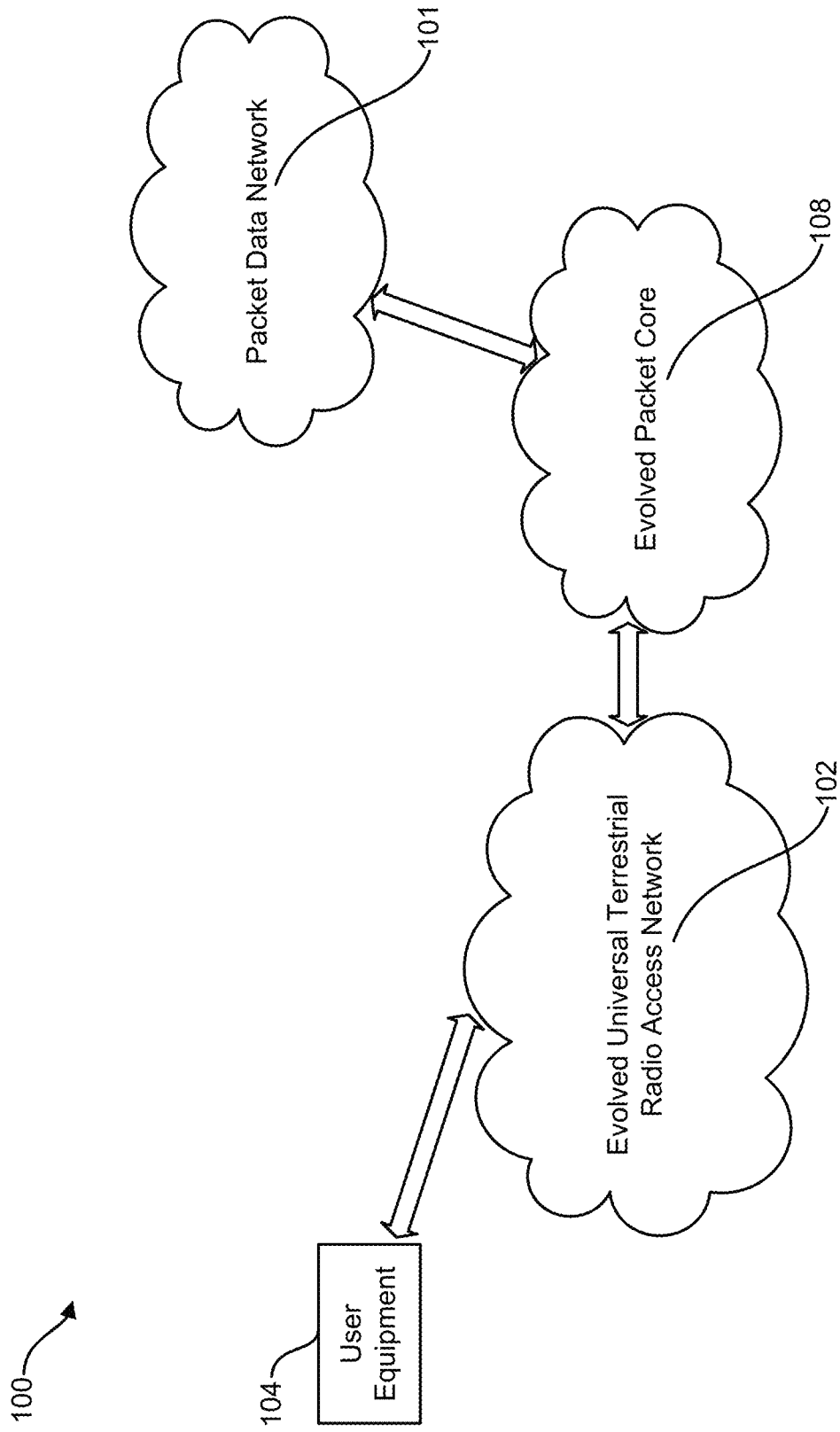
FIG. 1a illustrates an exemplary conventional long term evolution ("LTE") communications system.

The current subject matter can provide for systems and methods that can be implemented in wireless communications systems. Such systems can include various wireless communications systems, including 5G New Radio (5G NR) communications systems, long term evolution (LTE) communication systems, etc.

In general, the current subject matter relates to flexible carrier bandwidth handling in wireless communications systems.

In some implementations of the current subject matter, two signals can be transmitted on two fixed operating bandwidths defined by 3GPP for a wireless communications system from one communication device in the wireless communications system to another communication device in the wireless communications system. The two defined fixed operating bandwidths may be the same as each other or may be different from one another. Independently, neither of the signals includes a complete, usable signal for further use in the communications system per typical communications in the system. The signals are independently incomplete due to the signals reflecting use of a bandwidth that is not among the defined fixed operating bandwidths. However, the signals can be combined into a single signal that does include a complete, usable signal for further use in the communications system. The single signal can thus be further used as needed for communication in the wireless communications system and can be communicated in the system using one of the defined fixed operating bandwidths. Bandwidths that are not among the defined fixed operating bandwidths may thus be used for communications in the wireless communications system and therefore not be unused and a wasted available resource.

Operators that provide cellular services to customers may have the ability to use bandwidths that are not among the defined fixed operating bandwidths. Such operators may therefore be able to use these bandwidth resources that would otherwise be unused, wasted assets of the operator. For example, an operator may have the ability to use spectrum bandwidth released from a legacy network (e.g., 2G LTE, 3G LTE, etc.) that is not among the defined fixed operating bandwidths.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE for Mobile ("Global System Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1B:
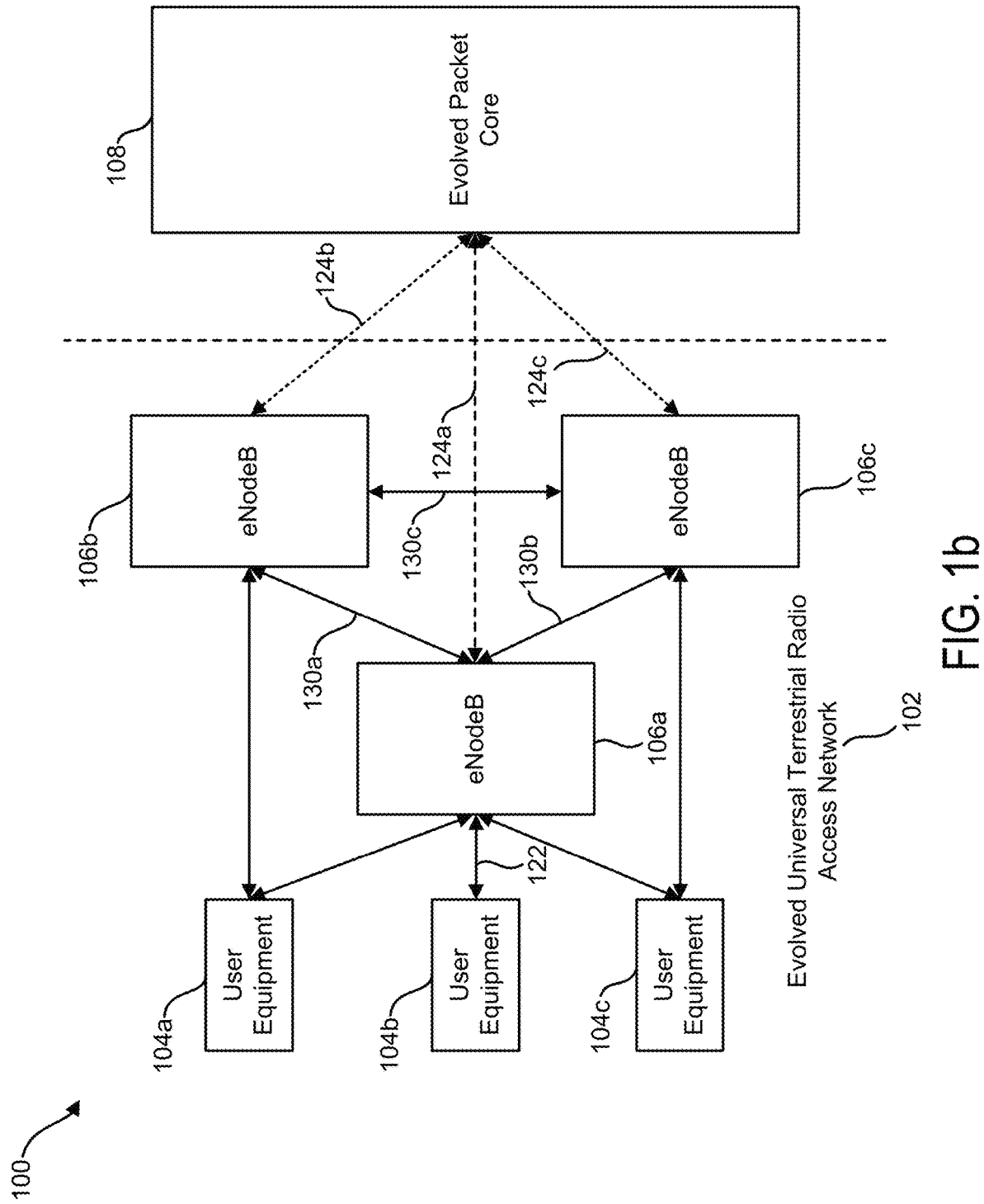

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
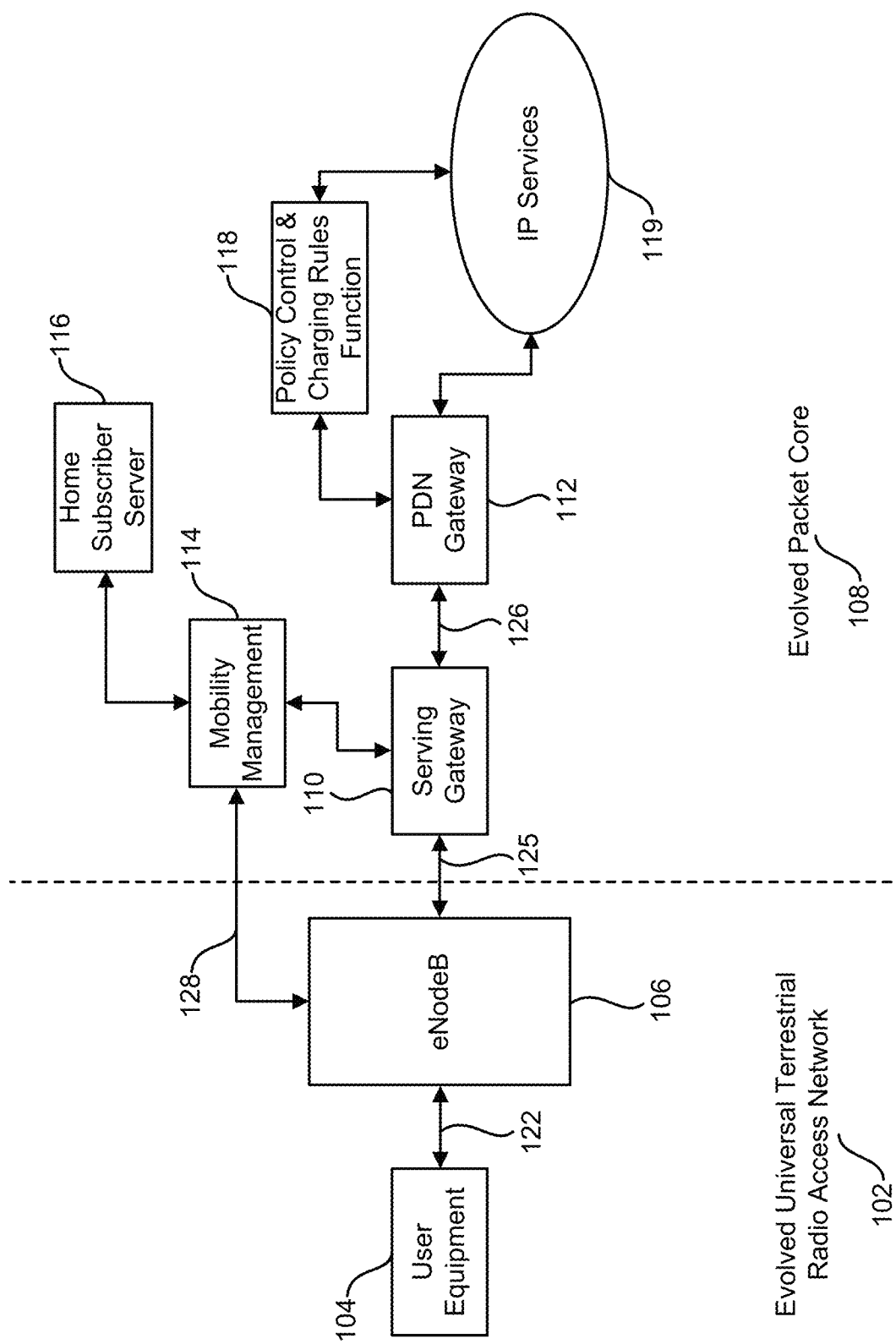

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1b, X2 interface 130a provides interconnection between eNodeB 106a and eNodeB 106b: X2 interface 130b provides interconnection between eNodeB 106a and eNodeB 106c: and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream Qos, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
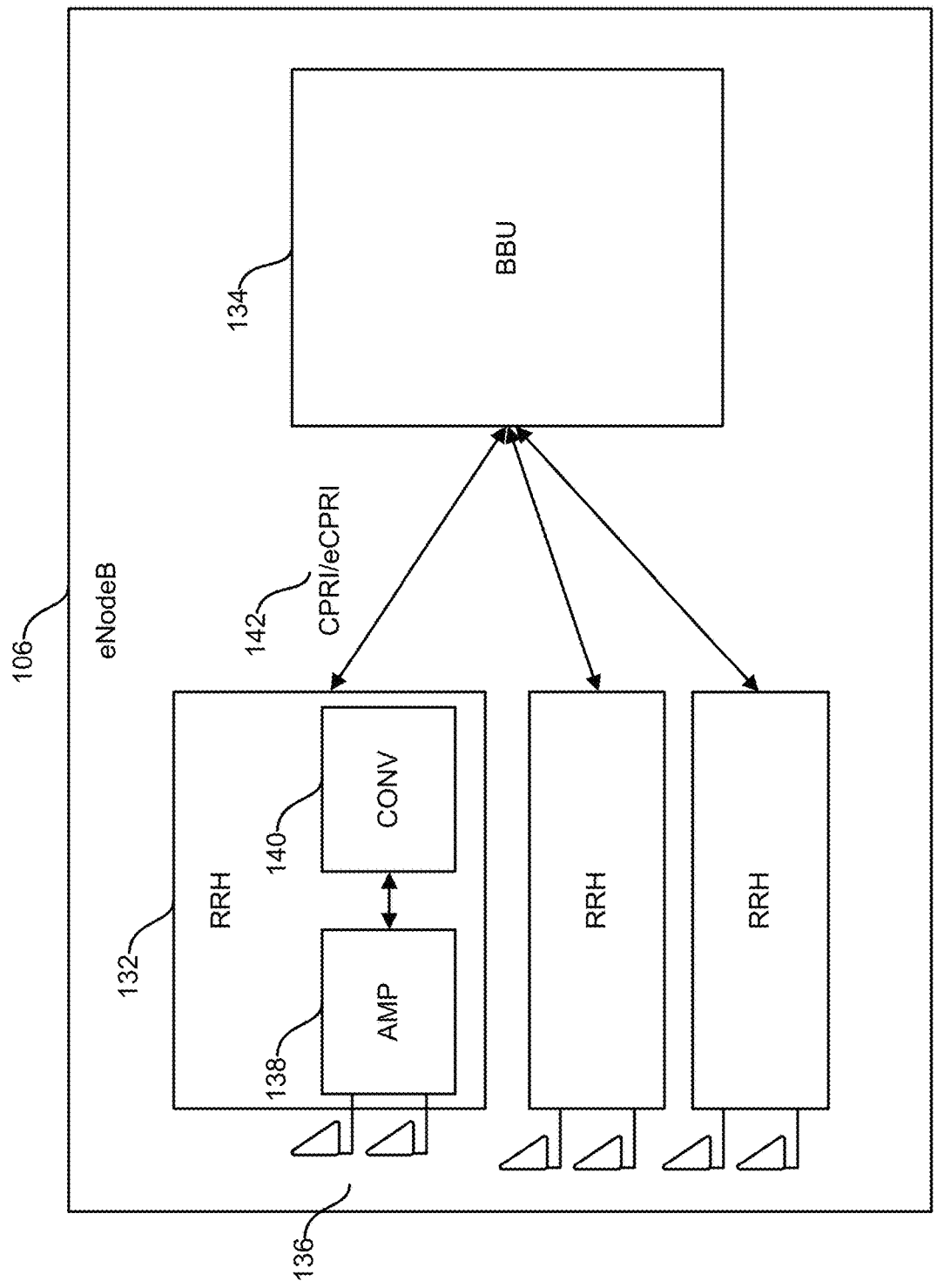

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using O-RAN Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHz), access scheme (downlink: OFDMA: uplink: SC-OFDMA), antenna technology (Single user and multi user MIMO; Uplink: Single user and multi user MIMO), number of sectors (6 maximum), maximum transmission rate (downlink: 150

Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1*d*) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1*d*). Conversely, the RF signals that are received from user equipment 104 are amplified (using AMP 138) and converted (using CONV 140) to digital baseband signals for transmission to the BBU 134.

Figure 2:
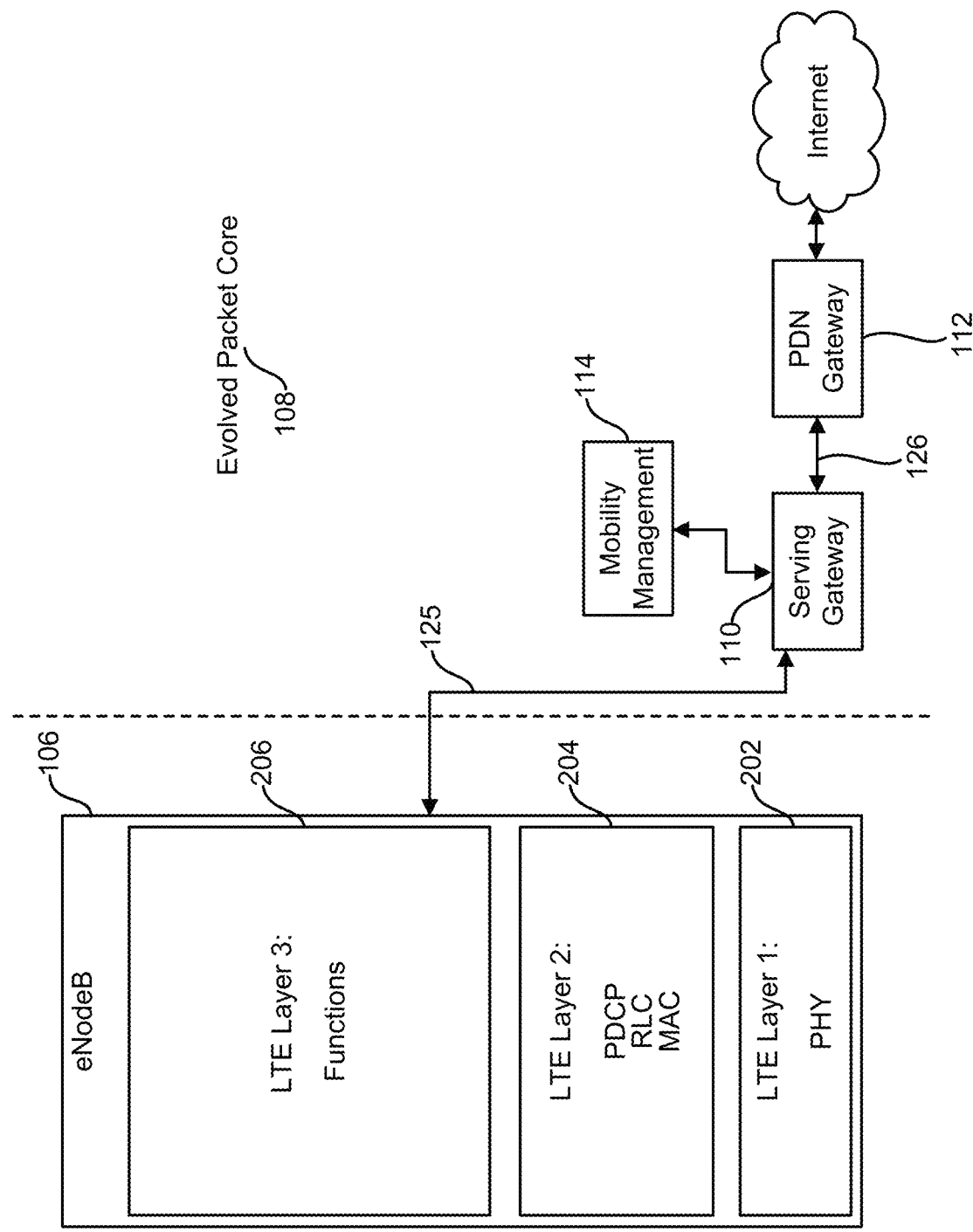
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
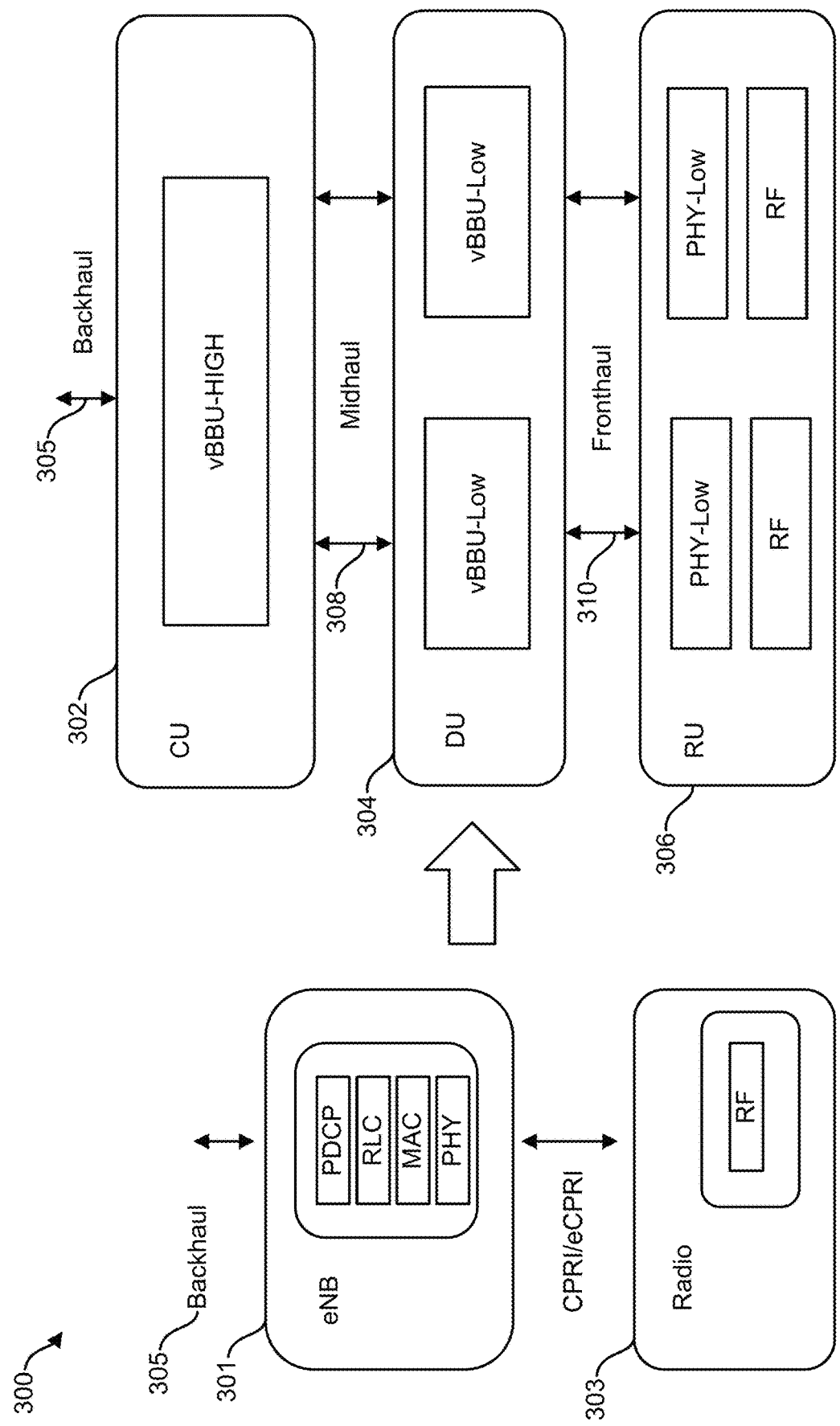
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 303, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DU units 304. The units 302, 304 can include one or more base stations, macro base stations, micro base stations, remote radio heads, etc. and/or any combination thereof.

In lower layer split architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer-split architecture, frequency-domain samples can be transported via Ethernet fronthaul, where the frequency-domain samples can be compressed for reduced fronthaul bandwidth.

Figure 4:
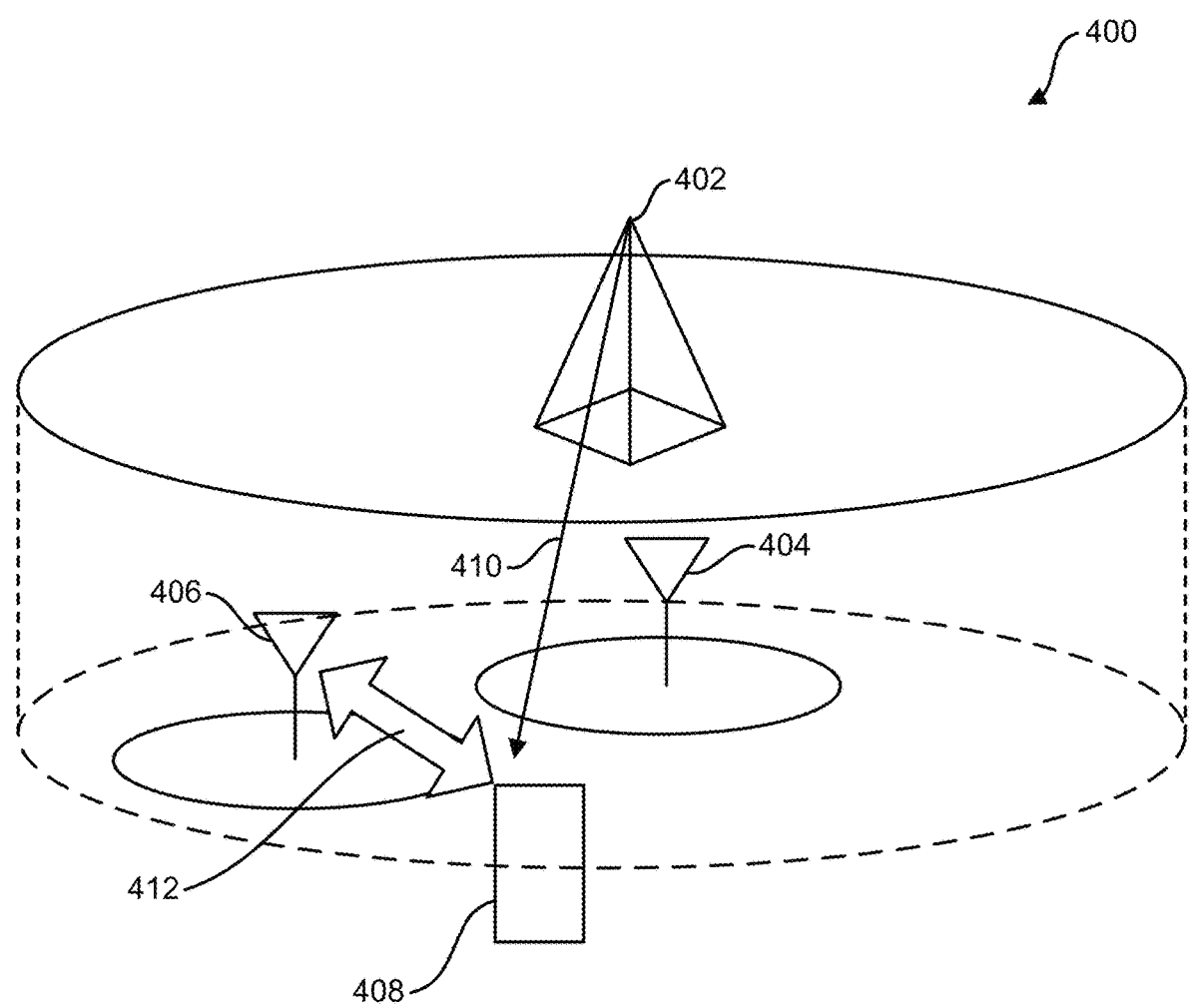
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHz). The system 400 can include a macro cell 402 and small cells 404 and 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
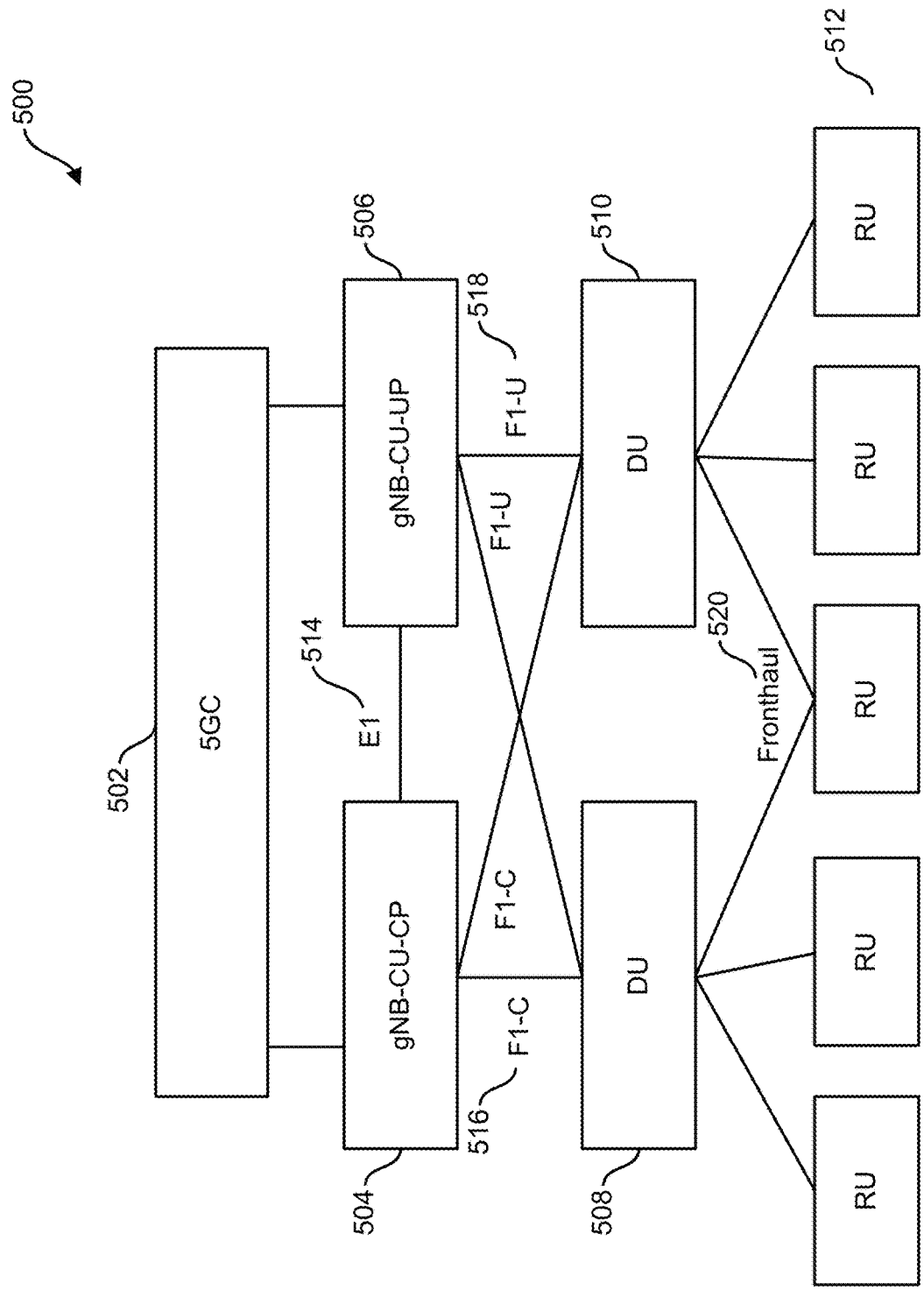
FIG. 5a illustrates an exemplary 5G wireless communication system.

FIG. 5*a* illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split architecture. The distributed units 508, 510 can be configured to execute RLC, MAC and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipment (not shown in FIG. 5*a*). The remote radio units 512 can be configured to execute a lower part of the PHY layer protocols as well as provide antenna capabilities to the remote units for communication with user equipments (similar to the discussion above in connection with FIGS. 1*a*-2).

Figure 5B:
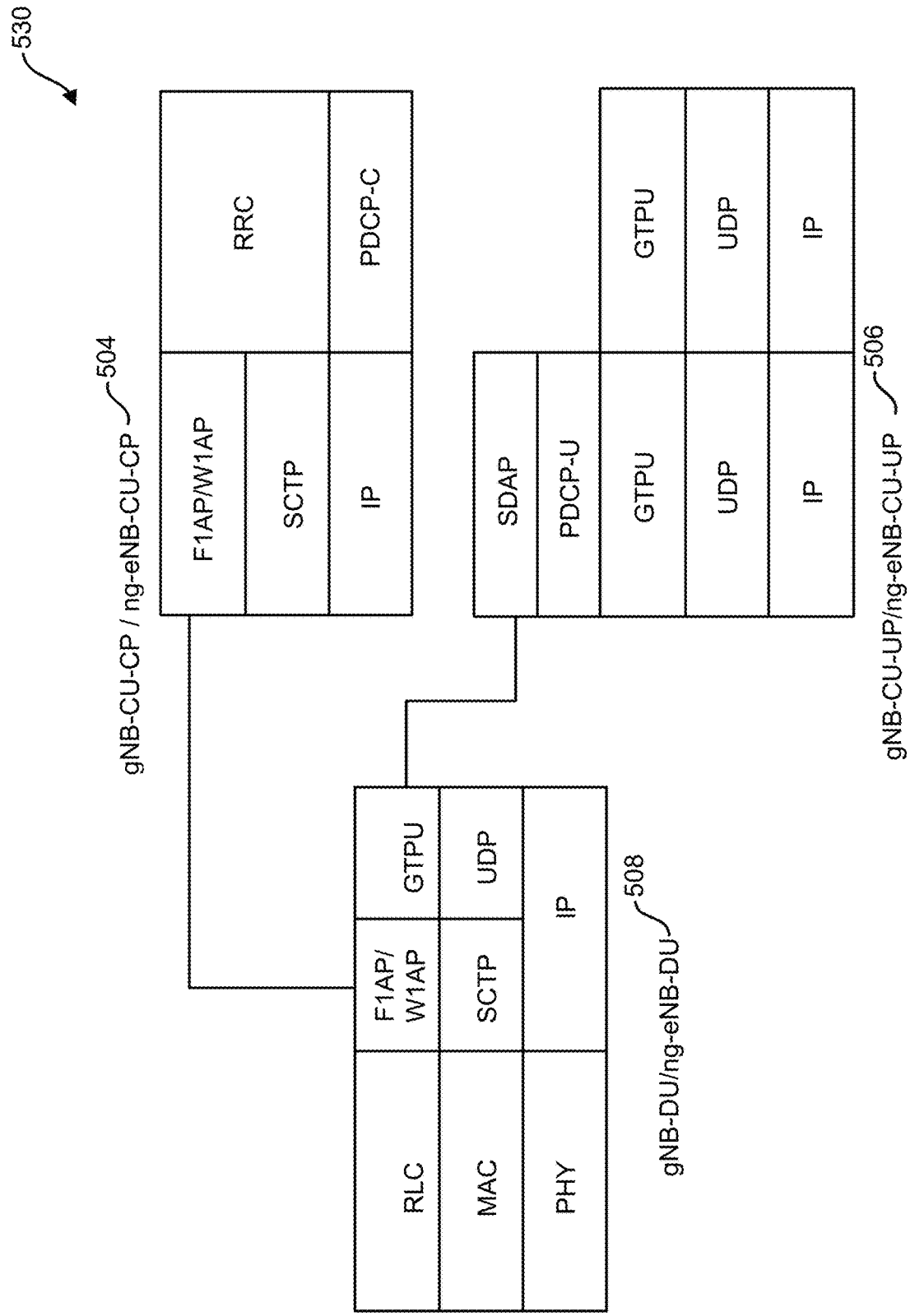
FIG. 5b illustrates an exemplary layer architecture of the split gNB and/or a split ng-eNB (e.g., next generation eNB that may be connected to 5GC)

FIG. 5*b* illustrates an exemplary layer architecture 530 of the split gNB. The architecture 530 can be implemented in the communications system 500 shown in FIG. 5*a*, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5*b*, the gNB-DU 508 can be communicatively coupled to the gNB-CU-CP control plane portion 504 (also shown in FIG. 5*a*) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol (F1-AP) sublayer, a GPRS tunneling protocol (GTPU) sublayer, a stream control transmission protocol (SCTP) sublayer, a user datagram protocol (UDP) sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control (PDCP-C) sublayers. Moreover, the distributed unit 508 may also be communicatively coupled to the user plane portion 506 of the centralized unit of the gNB. The user plane portion 506 may include service data adaptation protocol (SDAP), PDCP-user (PDCP-U), GTPU, UDP and IP sublayers.

Figure 5C:
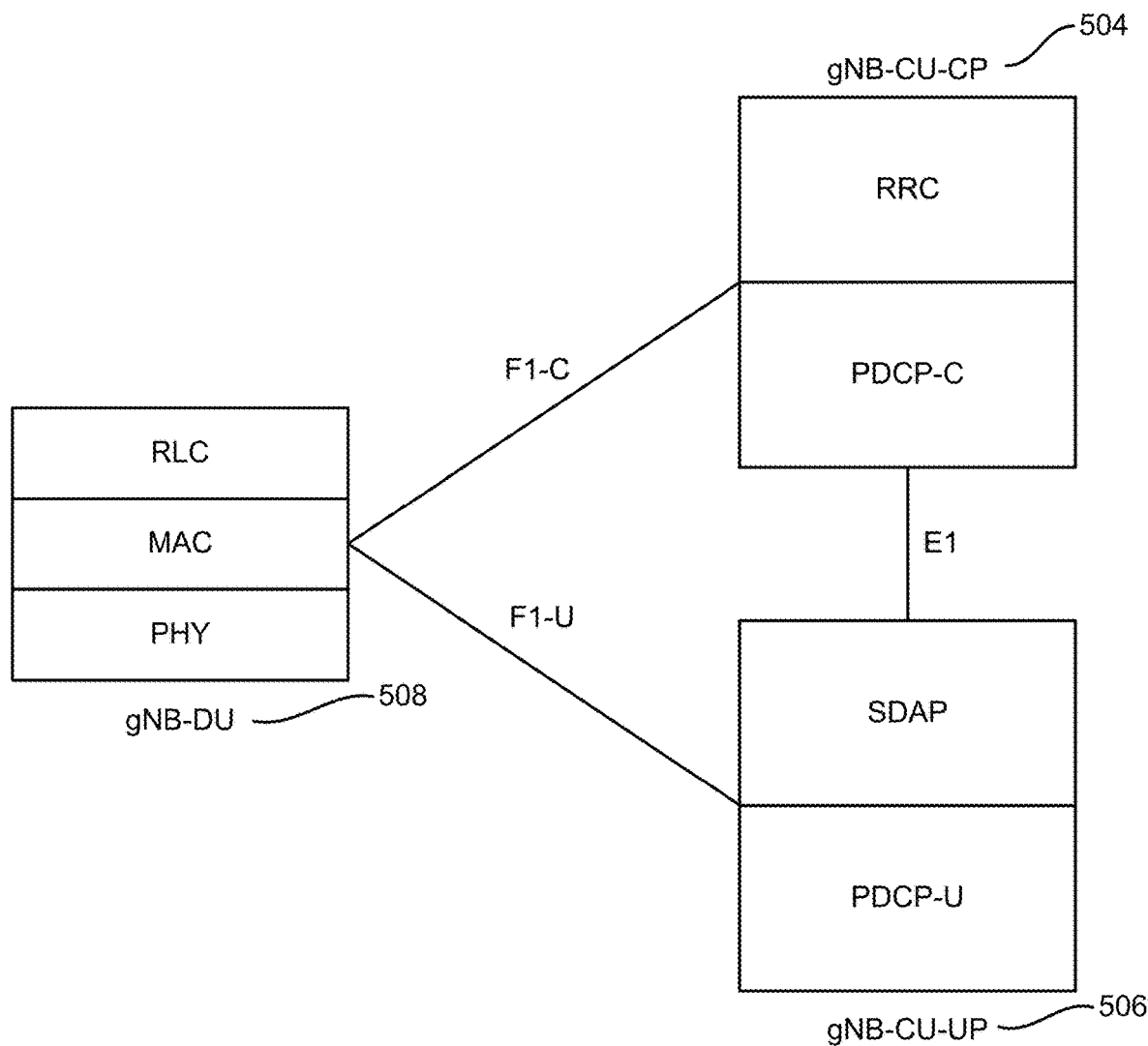
FIG. 5c illustrates an exemplary functional split in the gNB architecture shown in FIGS. 5a-b.

FIG. 5*c* illustrates an exemplary functional split in the gNB architecture shown in FIGS. 5*a*-*b*. As shown in FIG. 5*c*, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5*c*). As shown in FIG. 5*c*, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, FEC encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, RF processing, as well as other functions.

The MAC sublayer of Layer 2 can perform beam management, random access procedure, mapping between logical channels and transport channels, concatenation of multiple MAC service data units (SDUs) belonging to one logical channel into transport block (TB), multiplexing/demultiplexing of SDUs belonging to logical channels into/from TBs delivered to/from the physical layer on transport channels, scheduling information reporting, error correction through HARQ, priority handling between logical channels of one UE, priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Flexible Carrier Bandwidth Handling in Wireless Communications Systems

In some implementations of the current subject matter, two signals can be transmitted on two fixed operating bandwidths defined by 3GPP for a wireless communications system from one communication device in the wireless communications system to another communication device in the wireless communications system. The two defined fixed operating bandwidths may be the same as each other or may be different from one another. Independently, neither of the signals includes a complete, usable signal for further use in the communications system per typical communications in the system. The signals are independently incomplete due to the signals reflecting use of a bandwidth that is not among the defined fixed operating bandwidths. However, the signals can be combined into a single signal that does include a complete, usable signal for further use in the communications system. The single signal can thus be further used as needed for communication in the wireless communications system and can be communicated in the system using one of the defined fixed operating bandwidths. Bandwidths that are not among the defined fixed operating bandwidths may thus be used for communications in the wireless communications system and therefore not be unused and a wasted available resource.

In some implementations of the current subject matter, the communication device (e.g., a first communication device) that receives the signals can include one of an RU (e.g., RU 306 of FIG. 3, RU 512 of FIG. 5a, etc.) and a DU (e.g., DU 304 of FIG. 3, DUs 508, 510 of FIGS. 5a-5c, etc.), and the communication device (e.g., a second communication device) that transmits the signals to the first communication device can include the other of the RU and DU. In this way, UEs can communicate with the RU using a non-standard bandwidth (e.g., a bandwidth that is not among the fixed operating bandwidths defined by 3GPP for the wireless communications system), and the RU can handle processing signals received via the non-standard bandwidth for further use in the wireless communication system using a defined fixed operating bandwidth. In implementations in which the first communication device that receives the first and second signals includes the DU and the second communication device that transmits the first and second signals includes the RU, the communication of the signals is uplink communication. In implementations in which the first communication device that receives the first and second signals includes the RU and the second communication device that transmits the first and second signals includes the DU, the communication of the signals is downlink communication.

LTE wireless communication systems use frequency bands that support channel bandwidths specified in the 3GPP Standard (3GPP TS 36.101): 1.4 MHZ, 3 MHZ, 5 MHz, 10 MHz, 15 MHz, and 20 MHz. Thus, in implementations in which the wireless communications systems is an LTE wireless communication system, the single signal that is created from the multiple signals can be aligned with one of these defined fixed operating bandwidths.

5G NR wireless communication systems also use frequency bands that support channel bandwidths specified in the 3GPP Standard (3GPP TS 38.101): 5 MHz, 10 MHz, 15 MHz, 20 MHZ, 25 MHZ, 30 MHZ, 35 MHz, 40 MHz, 45 MHz, 50 MHZ, 60 MHZ, 70 MHz, 80 MHz, 90 MHz, and 100 MHz. Thus, in implementations in which the wireless communications systems is a 5G NR wireless communication system, the single signal that is created from the multiple signals can be aligned with one of these defined fixed operating bandwidths.

Each of the first and second signals transmitted by one communication device and received by another communication device can be considered a component carrier (CC). Combining the first and second signals can be considered carrier aggregation (CA). Wireless communications systems such as LTE and 5G NR support use of CCs and CA.

Table 1 shows some examples of carrier bandwidths for the first signal (CC1 Carrier Bandwidth) and for the second signal (CC2 Carrier Bandwidth) that are each aligned with one of the defined fixed operating bandwidths for LTE wireless communication systems. Table 1 also shows aggregate bandwidth reflected by the first and second signals for each of the first and second signal examples. The aggregate bandwidth is one not of the defined fixed operating bandwidths for LTE wireless communication systems.

TABLE 1

| Aggregate Bandwidth | CC1 Carrier Bandwidth | CC2 Carrier Bandwidth |
|---|---|---|
| 2.6 MHz | 1.4 MHz | 1.4 MHz |
| 4 MHz | 3 MHz | 1.4 MHz |
| 5.7 MHz | 3 MHz | 3 MHz |
| 7.3 MHz | 5 MHz | 3 MHz |
| 7.6 MHz | 5 MHz | 3 MHz |
| 8.6 MHz | 5 MHz | 5 MHz |
| 8.9 MHz | 5 MHz | 5 MHz |
| 10.8 MHz | 10 MHz | 1.4 MHz |
| 12.2 MHz | 10 MHz | 3 MHz |
| 12.5 MHz | 10 MHz | 3 MHz |
| 14.1 MHz | 10 MHz | 5 MHz |
| 14.4 MHz | 10 MHz | 5 MHz |
| 17.1 MHz | 15 MHz | 3 MHz |
| 17.4 MHz | 15 MHz | 3 MHz |
| 18.7 MHz | 15 MHz | 3 MHz |
| 19 MHz | 15 MHz | 3 MHz |
| 23.9 MHz | 20 MHz | 5 MHz |
| 27.6 MHz | 20 MHz | 5 MHz |
| 28.5 MHz | 20 MHz | 5 MHz |

Figure 6:
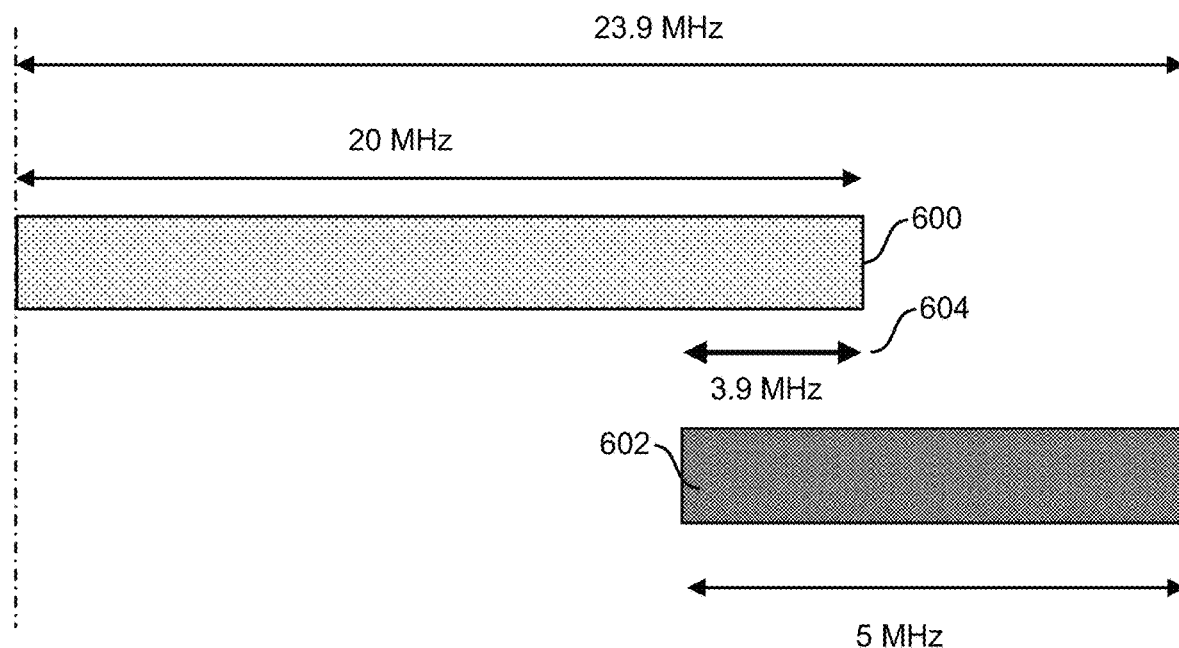
FIG. 6 illustrates exemplary first and second signals, according to some implementations of the current subject matter.

FIG. 6 illustrates one of the examples shown in Table 1, in particular the third to last row. As shown in FIG. 6, a first signal 600 is transmitted from a communication device using a defined fixed operating bandwidth of 20 MHz, and a second signal 602 is transmitted from the communication device using a defined fixed operating bandwidth of 5 MHz. The aggregate bandwidth of the first and second signals 600, 602 is an undefined bandwidth of 23.9 MHZ, as reflected by an overlap 606 of the first and second signals 600, 602. The first and second signals 600, 602 of FIG. 6 are transmitted on different fixed operating bandwidths, but can instead be transmitted on the same fixed operating bandwidth, e.g., as shown in the first, third, and sixth rows of Table 1.

Table 1 is in the LTE context such that in each row the first and second carrier bandwidths are each one of the defined fixed operating bandwidths for LTE wireless communication systems and the associated aggregate bandwidth is not one of the defined fixed operating bandwidths for LTE wireless communication systems. Carrier bandwidths and aggregate bandwidths may be similarly used in another, e.g., 5G NR, wireless communications system with the first and second carrier bandwidths each being one of the defined fixed operating bandwidths for the other, e.g., 5G NR, wireless communication system and the associated aggregate bandwidth not being one of the defined fixed operating bandwidths for the other, e.g., 5G NR, wireless communication system.

A wireless communications system using a radio access network (RAN) architecture can be implemented in compliance with O-RAN Alliance standards. Such standards do not currently allow for use of non-defined fixed operating bandwidths. In a context of O-RAN disaggregated RAN architecture with lower layer (split 7-2x), functionality of O-DUs (distributed units (DUs) in an O-RAN architecture)

and O-RUs (radio units (RUs) in an O-RAN architecture) is defined in the O-RAN Working Group 4 (Open Fronthaul Interfaces WG) Control, User and Synchronization Plane Specification and the O-RAN Working Group 4 (Open Fronthaul Interfaces WG) Management Plane Specification. In the split 7-2x interface, the O-RAN Alliance provides that the fronthaul network is between resource element mapping in the O-DU and time-frequency conversion in the O-RU. In the downlink (DL) direction, subcarrier mapping can be performed and data can be transformed in the frequency domain to the time domain by applying inverse fast Fourier transform (IFFT) processing and performing cyclic prefix (CP) addition. In the uplink (UL) direction, subcarrier de-mapping can be performed and data can be transformed in the time domain to the frequency domain by performing CP removal and applying FFT processing.

In some implementations, the current subject matter can be applied in the split 7-2x interface defined by the O-RAN Alliance. In some implementations, the current subject matter can be applied in another existing split (e.g., Split-6 by Small Cell Forum, etc.) or can be applied in a future interface (e.g. 7-2C, 7-3, etc.).

In some implementations of the current subject matter, a method for flexible carrier bandwidth handling in wireless communications system can include first and second signals being transmitted from one communication device (e.g., one of an RU and a DU) in a wireless communications system to another communication device (e.g., the other of the RU and the DU) in the wireless communications system with each of the first and second signals being transmitted using a bandwidth that is among the fixed operating bandwidths defined by 3GPP for the wireless communications system. Each of the first and second signals can include at least one null subcarrier value and at least one non-null subcarrier value. The at least one null subcarrier values of the first and second signals reflect that a non-standard bandwidth. In other words, one or more subcarrier values are null in the signals because neither signal includes a complete, usable signal. The first and second signals can be combined into a single signal that does not include the at least one null subcarrier values of the first and second signals. The single signal can thus only include non-null subcarrier values and thereby be a complete, usable signal that can be aligned with one of the defined fixed operating bandwidths. Bandwidths that are not among the defined fixed operating bandwidths may thus be used for communications in the wireless communications system and therefore not be unused and a wasted available resource.

Figure 7:
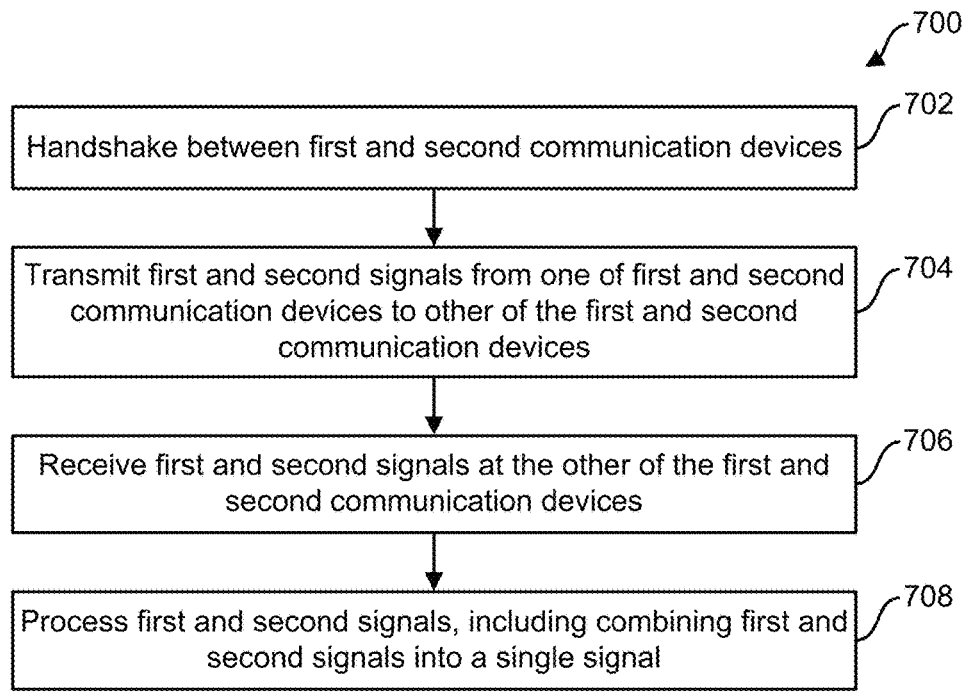
FIG. 7 illustrates an exemplary method, according to some implementations of the current subject matter.

FIG. 7 illustrates one implementation of a method 700 for flexible carrier bandwidth handling in wireless communications systems, according to some implementations of the current subject matter. The method 700 is described with respect to O-RAN split 7-2x but can be implemented similarly with another split. Also, the method 700 is described with respect to an LTE wireless communications system but can be implemented similarly with another wireless communication system, e.g., 5G NR, etc.

The method 700 can include a handshake 702 between first and second communications devices. As mentioned above, in some implementations of the subject matter, the first and second communications devices can include a DU (e.g., DU 304 of FIG. 3, DUs 508, 510 of FIGS. 5a-5c, etc.) and an RU (e.g., RU 306 of FIG. 3, RU 512 of FIG. 5a, etc.). The method 700 is this described with respect to a DU and an RU, and in particular an O-DU and an O-RU.

Performing the handshake 702 can establish that use of overlapping subcarrier signals each having at least one null subcarrier value is valid. The handshake 702 can therefore signal RU capability to support overlapped mapping/de-mapping of subcarriers from two different component carriers. An error may thus be avoided by receipt of overlapping subcarriers, e.g., by a collision of the signals.

The performance of the handshake 702 can be triggered upon a fronthaul connection being established between the RU and the DU. The RU and the DU may thus quickly establish that use of overlapping subcarrier signals each having at least one null subcarrier value is valid so as to avoid occurrence of any errors related to the overlap of the subcarrier signals.

Figure 8A:
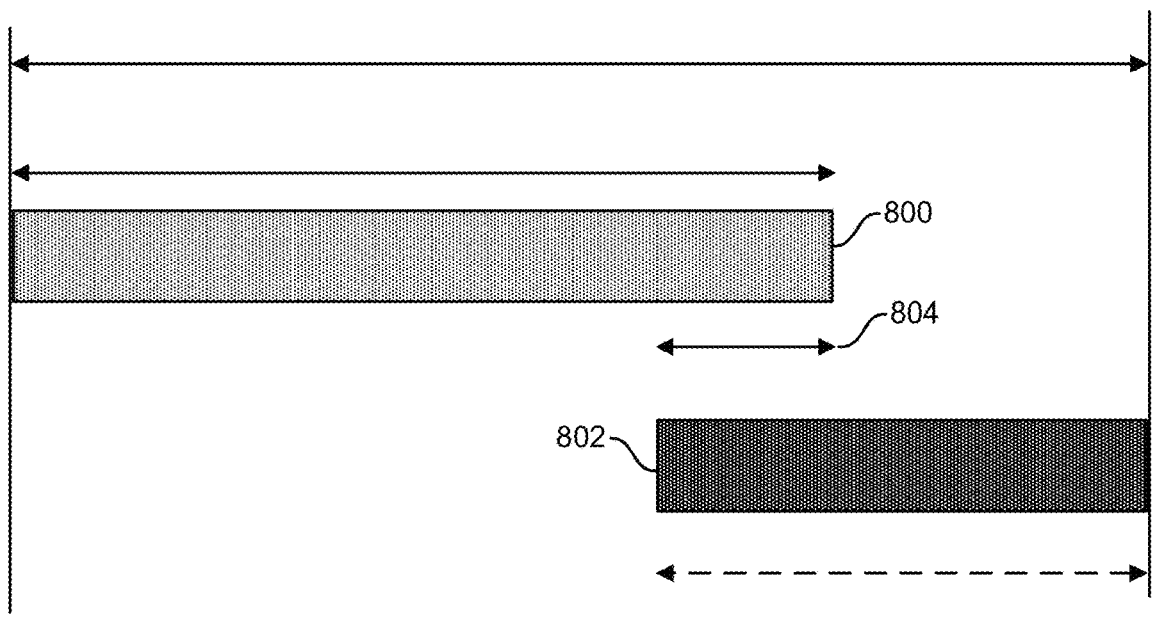
FIG. 8a illustrates exemplary first and second signals that may be transmitted and received in the method of FIG. 7, according to some implementations of the current subject matter.

The method 700 can also include, after the handshake 702, one of the RU and the DU transmitting 704 first and second signals 800, 802 (see FIG. 8a) to the other of the RU and the DU, e.g., transmitted 704 on the fronthaul network. The first and second signals 800, 802 are adjacent to one another and are each transmitted using a defined fixed operating bandwidth, which may be different from or the same as each other, and reflect use of a bandwidth that is not among the defined fixed operating bandwidths. The first and second signals 800, 802 each include subcarrier signals that have an overlap 804. For example, the first and second signals 800, 802 can be the first and second signals 600, 602 of FIG. 6 that have an overlap 604.

Figure 8B:
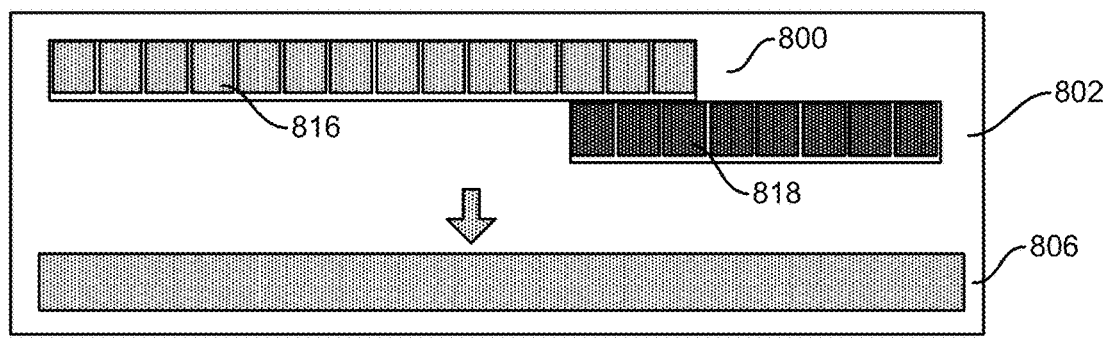
FIG. 8b illustrates the first and second signals of FIG. 8a and a single signal formed by combining the first and second signals, according to some implementations of the current subject matter.

The other of the RU and the DU receives 706 each of the first and second signals 800, 802. After receiving 706 the first and second signals 800, 802, the receiving one of the RU and the DU processes and combines 708 the first and second signals 800, 802 into a single signal 806, as shown in FIG. 8b.

Processing 708 the first and second signals 800, 802 can include multiplexing the first and second signals 800, 802. The multiplexing can be performed in accordance with the 3GPP and O-RAN standards.

After the first and second signals 800, 802 have been multiplexed, IFFT/FFT processing can be performed. The processing 708 of the first and second signals 800, 802 can include using one IFFT/FFT engine or can include using two IFFT/FFT engines.

Figure 9A:
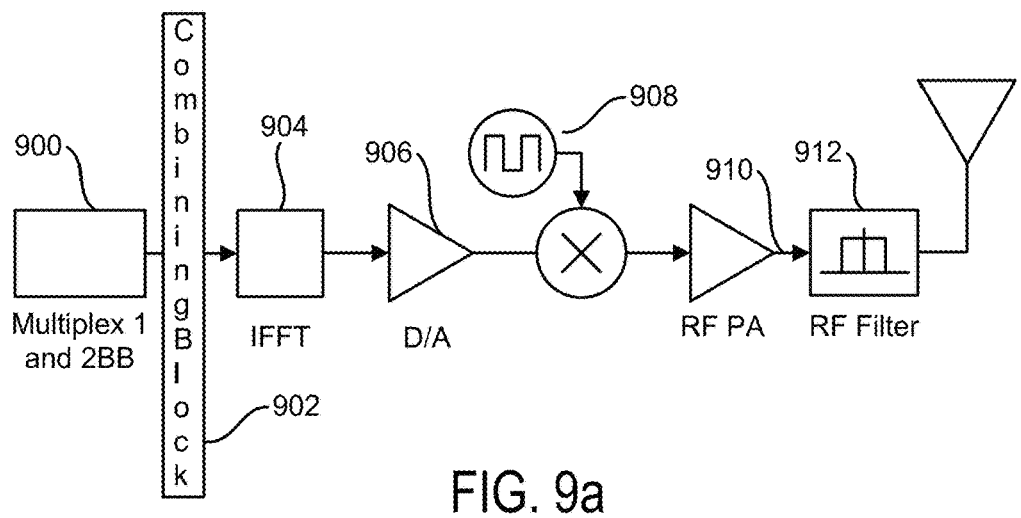
FIG. 9a illustrates an exemplary system for processing and combining that may be performed in the method of FIG. 7, according to some implementations of the current subject matter.

In some implementations, as shown in FIG. 9a, the processing 708 of the first and second signals 800, 802 can include using one IFFT/FFT engine 904 after the first and second signals 800, 802 have been multiplexed, e.g., using a multiplexor 900. The engine 904 is shown as an IFFT engine 904 in FIG. 9a, indicative of a downlink communication, but the engine 904 can instead be a FFT engine, indicative of an uplink communication.

Before the IFFT/FFT processing, the first and second signals 800, 802 can be combined 708 using a combiner 902.

According to the O-RAN Alliance, freqOffset information received in the C-plane, e.g., received by the other of the RU and the DU, indicates the location of lowest Resource Element's (RE's) center in the lowest resource block (RB) defined by frameStructure, with respect to center-of-channel-bandwidth. An RE is one subcarrier of an orthogonal frequency-division multiplexing (OFDM) symbol. A physical resource block (PRB) is a group of 12 subcarriers of an OFDM signal. Also according to the O-RAN Alliance, offset-to-absolute-frequency-center information received in the management plane (M-plane), e.g., received by the other of the RU and the DU, indicates the location of lowest RE's center in the lowest RB defined by frameStructure, with respect to center-of-channel-bandwidth unit, is ½ subcarrier spacing (SCS).

Figure 8C:
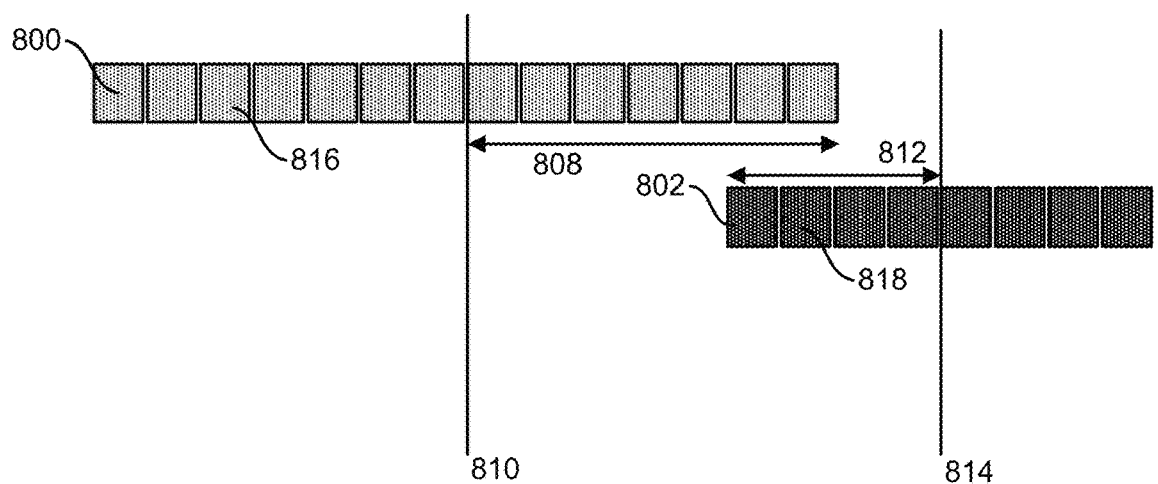
FIG. 8c illustrates subcarrier values, freqOffsets, and absolute-frequency-centers of the first and second signals of FIGS. 8a and 8b, according to some implementations of the current subject matter.

FIG. 8c shows a freqOffset 808 of the received first signal 800 and an absolute-frequency-center 810 of the received first signal 800. FIG. 8c also shows a freqOffset 812 of the received second signal 802 and an absolute-frequency-center 814 of the received second signal 802.

Because the one of the RU and the DU that received 706 the first and second signals 800, 802 knows the freqOffsets 808, 812 and the absolute-frequency-centers 810, 814 of the received first and second signals 800, 802, the one of the RU and the DU can determine therefrom the overlap 804 of the first and second signals 800, 802, e.g., determine the frequency and time domain offset of the first and second signals 800, 802. In this way, detecting the subcarrier overlap 804 can be accomplished using digital domain IQ data transmitted in a frequency domain of each of the first and second signals 800, 802 and using symbol duration transmitted in a time domain of each of the first and second signals 800, 802. Because of the previously performed handshake 702, the one of the RU and the DU that received 706 the first and second signals 800, 802 will know that the overlap 804 of the signals 800, 802 is acceptable such that an error will not occur because of the overlap 804.

FIGS. 8b and 8c also show subcarrier values 816, 818 of the first and second signals 800, 802. FIGS. 8b and 8c show the first signal 800 as including fourteen subcarrier values 816 and the second signal 802 as including eight subcarrier values 818. Each of the first and second signals 800, 802 can include another number of subcarrier values. Typically, OFDM signals such as the first and second signals 800, 802 include more than eight or fourteen subcarrier values.

Figure 10A:
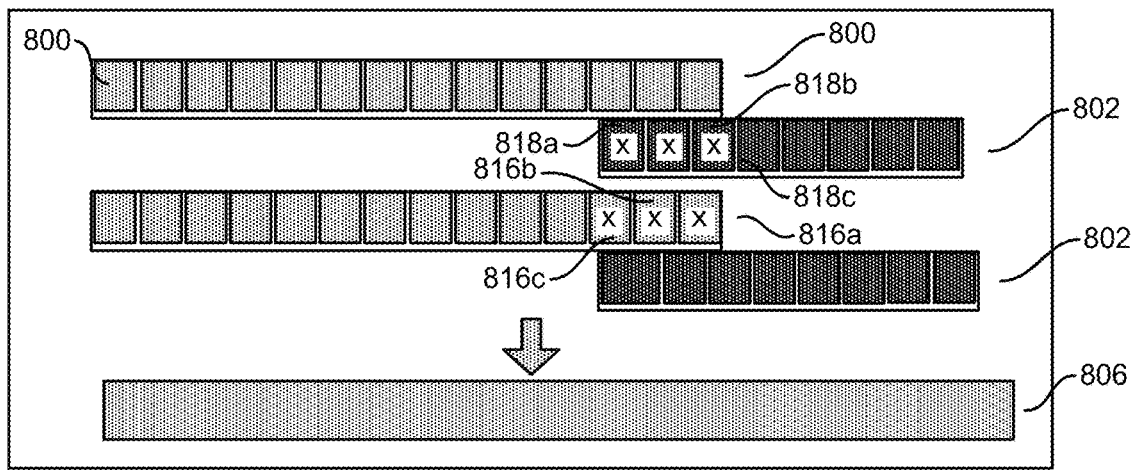
FIG. 10a illustrates the single signal of FIG. 8b and null and non-null subcarrier values of the first and second signals of FIGS. 8a-8c, according to some implementations of the current subject matter.

Having detected the overlap 804 of the first and second signals 816, 818, the subcarrier values 816, 818 in the overlap 804 can be identified. As shown in FIG. 10a, three subcarrier values 816a, 816b, 816c of the first signal 800 are in the overlap 804, and three subcarrier values 818a, 818b, 818c of the second signal 802 are in the overlap 804. The overlapping subcarrier values 816a, 816b, 816c, 818a, 818b, 818c each have a null value, indicated by an "x" in FIG. 10a for those subcarrier values 816a, 816b, 816c, 818a, 818b, 818c. The first and second signals 800, 802 thus each include at least one null subcarrier value, e.g., three null subcarrier values although another number of null subcarrier values is possible (e.g., depending on the overlap size). A reminder of the subcarrier values 816 of the first signal 800 (e.g., eleven subcarrier values 816) and a remainder of the subcarrier values 818 of the second signal 802 (e.g., five subcarrier values 818) each have a non-null subcarrier value, indicated by a lack of an "x" in FIG. 10a for those subcarrier values 816, 818.

Figure 10B:
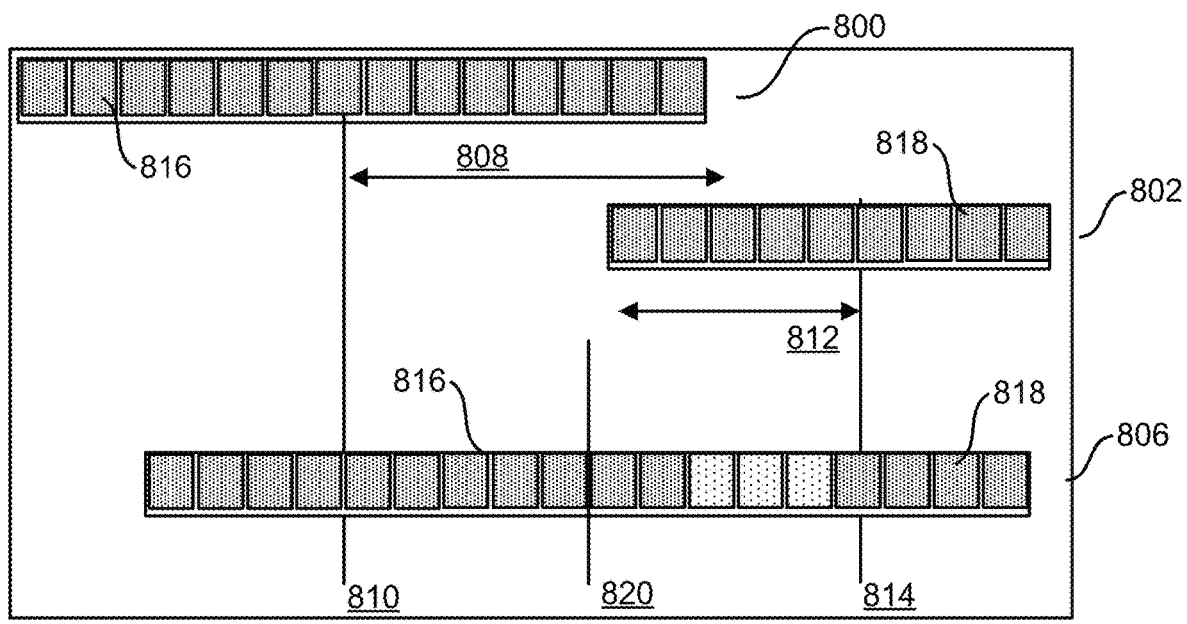
FIG. 10b illustrates the null and non-null subcarrier values of the first and second signals of FIG. 10a and non-null subcarrier values of the single signal of FIGS. 8b and 10a, according to some implementations of the current subject matter.

The combining 708 of the first and second signals 800, 802 performed by the combiner 902 can include removing the subcarrier values 816a, 816b, 816c, 818a, 818b, 818c having null values, e.g., removing the subcarrier values 816a, 816b, 816c, 818a, 818b, 818c in the overlap 804, and merging the subcarrier values 816, 818 having non-null values into one signal that forms the single signal 806, which is shown in FIGS. 8b, 10a, and 10b. FIG. 10b also shows an absolute-frequency-center 820 of the single signal 806.

As shown in the illustrated implementation of FIG. 10a, the null subcarrier values 816a, 816b, 816c of the first signal 800 trail the non-null subcarrier values 816 of the first signal 800, and the null subcarrier values 818a, 818b, 818c of the second signal 802 lead the non-null subcarrier values 818 of the second signal 802. Merging the subcarrier values 816, 818 having non-null values into one signal thus includes using the leading subcarrier values 816 of the first signal 800 as the leading subcarrier values of the combined single signal 806 and using the trailing subcarrier values 818 of the second signal 802 as the trailing subcarrier values of the combined single signal 806. The single signal 806 can thus include only non-null subcarrier values, e.g., all of the non-null subcarrier values 816 of the first signal 800 followed by all of the non-null subcarrier values 818 of the second signal 802.

Referring again to FIG. 9a, after the combiner 902 has combined the first and second signals 800, 802 to form the single signal 806, the single signal 806 can be further processed 708 for use in further communication in accordance with 3GPP. As shown in FIG. 9a, the processing 708 can include applying IFFT to the single signal 806 using the IFFT engine 904, then processing the resulting signal using a digital to analog converter 906, then applying a pulse 908 to the resulting signal, then processing the resulting signal using a radio frequency (RF) power amplifier (PA) 910, and then filtering the resulting signal using an RF filter 912.

Figure 9B:
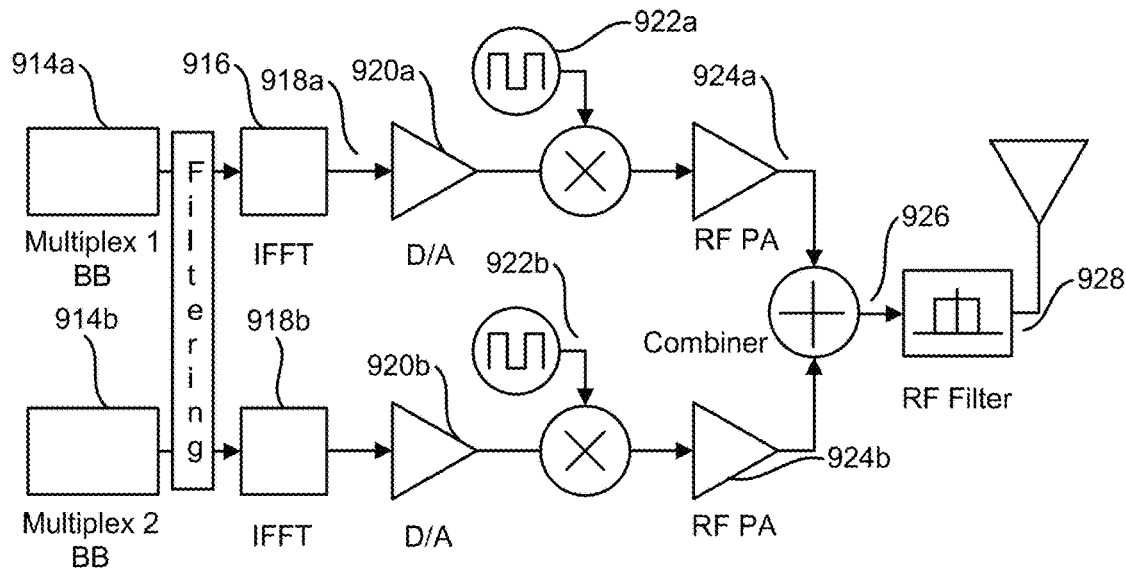
FIG. 9b illustrates another exemplary system for processing and combining that may be performed in the method of FIG. 7, according to some implementations of the current subject matter.

In other implementations, as shown in FIG. 9b, the processing 708 of the first and second signals 800, 802 can include using two IFFT/FFT engines 916a, 916b. In this implementation, the first and second signals 800, 802 are processed on parallel tracks from multiplexing through RF power amplification before being combined by a combiner 926 into the single signal 806.

As shown in FIG. 9b, after the first and second signals 800, 802 have been multiplexed, e.g., using a first multiplexor 914a for the first signal 800 and a second multiplexor 914b for the second signal 802, and filtered using a filter 916, the multiplexed first and second signals can be processing using first and second IFFT engines 918a, 918b, respectively. The engines 918a, 918b are shown as IFFT engines 918a, 918b in FIG. 9b, indicative of a downlink communication, but the engines 918a, 918b can instead be FFT engines, indicative of an uplink communication. The processing 708 can then include processing each of the two resulting signals using first and second digital to analog converters 920a, 920b, respectively, then applying first and second pulses 922a, 922b to the two resulting signals, respectively, and then processing the resulting signals using first and second RF PAs 924a, 924b, respectively. The resulting signals can then be combined using the combiner 926 similar to that discussed above regarding the combiner 902 of FIG. 9a. The resulting signal can then be filtered using an RF filter 928.

Figure 11:
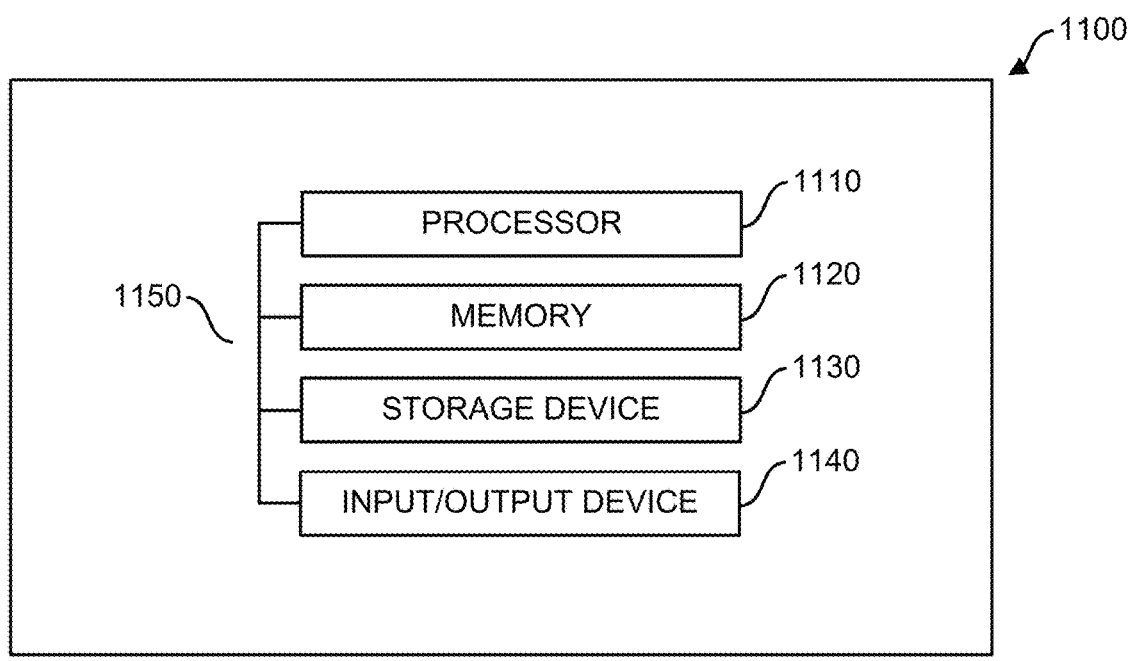
FIG. 11 illustrates an exemplary system, according to some implementations of the current subject matter.

In some implementations, the current subject matter can be configured to be implemented in a system 1100, as shown in FIG. 11. The system 1100 can include one or more of a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 600. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

Figure 12:
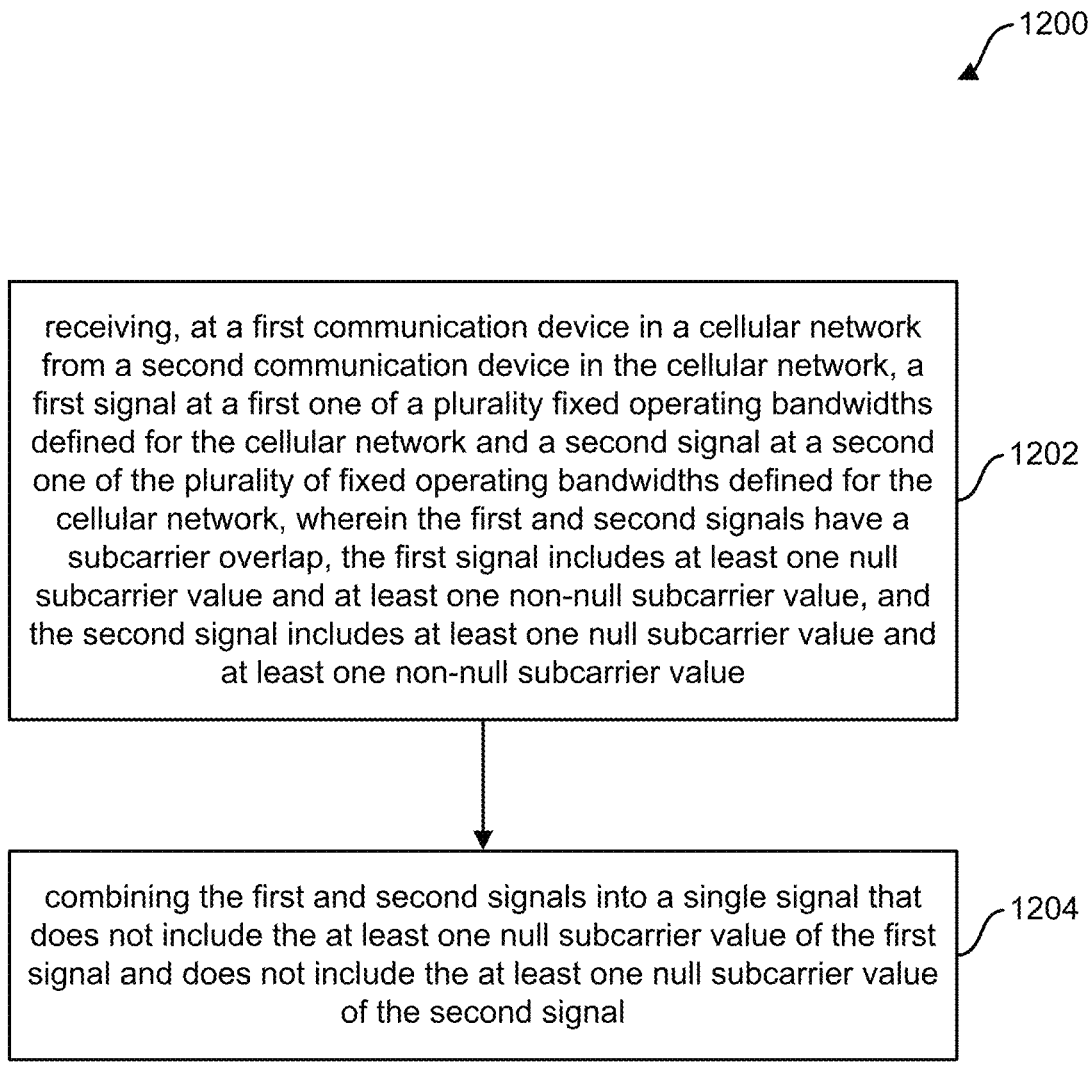
FIG. 12 illustrates another exemplary method, according to some implementations of the current subject matter.

FIG. 12 illustrates an exemplary method 1200 for flexible carrier bandwidth handling in wireless communications systems, according to some implementations of the current subject matter. The method 1200 may be performed, for example, using implementations shown in and described with respect to FIGS. 6-10b.

The method 1200 includes receiving 1202, at a first communication device (e.g., an RU) in a cellular network (e.g., an LTE network, a 5G NR network, etc.) from a second communication device in the cellular network, a first signal at a first one of a plurality of fixed operating bandwidths defined for the cellular network (e.g., defined by 3GPP) and a second signal at a second one of the plurality of fixed operating bandwidths defined for the cellular network. The first and second signals can have a subcarrier overlap, the first signal can include at least one null subcarrier value and at least one non-null subcarrier value, and the second signal can include at least one null subcarrier value and at least one non-null subcarrier value. The method also includes combining 1204 the first and second signals into a single signal that does not include the at least one null subcarrier value of the first signal and does not include the at least one null subcarrier value of the second signal.

In some implementations, the current subject matter can include one or more of the following optional features.

In some implementations, the at least one null subcarrier value of the first signal may follow the at least one non-null subcarrier value of the first signal, the at least one null subcarrier value of the second signal can lead the at least one non-null subcarrier value of the second signal, and combining the first and second signals into the single signal may include using the at least one non-null subcarrier value of the first signal as leading subcarrier values of the single signal and using the at least one non-null subcarrier value of the second signal as trailing subcarrier values of the single signal that trail all of the leading subcarrier values.

In some implementations, an error state may occur when the at least one null subcarrier value of the first signal leads the at least one non-null subcarrier value of the first signal and the at least one non-null subcarrier value of the second signal leads the at least one null subcarrier value of the second signal.

In some implementations, the at least one non-null subcarrier value of the first signal may overlap the at least one null subcarrier value of the second signal, and the at least one non-null subcarrier value of the second signal may overlap the at least one null subcarrier value of the first signal.

In some implementations, the method may further include, after combining the first and second signals into the single signal, applying IFFT processing or FFT processing to the single signal.

In some implementations, the method may further include, before combining the first and second signals into the single signal: applying IFFT processing or FFT processing to the first signal, and applying IFFT processing or FFT processing to the second signal.

In some implementations, the single signal may reflect a bandwidth that is not one of the plurality of fixed operating bandwidths defined for the cellular network.

In some implementations, the method may further include performing a handshake between the first and second communication devices that establishes an understanding that the combining will be later performed.

In some implementations, the method may further include detecting the subcarrier overlap using digital domain IQ data transmitted in a frequency domain of each of the first and second signals and using symbol duration transmitted in a time domain of each of the first and second signals, and the detecting may facilitate the combining of the first and second signals into the single signal.

In some implementations, one of the first and second communication devices may include a distributed unit (e.g., DU 304 of FIG. 3, DUs 508, 510 of FIGS. 5a-5c, etc.), and the other of the first and second communication devices may include a radio unit (e.g., RU 306 of FIG. 3, RU 512 of FIG. 5a, etc.). Further, the first communication device that receives the first and second signals may include the distributed unit and the second communication device may include the radio unit such the communication is uplink communication, or the first communication device that receives the first and second signals may include the radio unit and the second communication device may include the distributed unit such that the communication is downlink communication. Further, the first communication device may perform the combining.

In some implementations, the cellular network may be a 3GPP LTE network. Further, the single signal may reflect a bandwidth that is not one of the plurality of fixed operating bandwidths defined for the network (e.g., defined by 3GPP TS 36.101).

In some implementations, the cellular network may be a 5G network. Further, the single signal may reflect a bandwidth that is not one of the plurality of fixed operating bandwidths defined for the network (e.g., defined by 3GPP TS 38.101).

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order: as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback: and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving, at a first communication device in a cellular network from a second communication device in the cellular network, a first signal at a first one of a plurality of fixed operating bandwidths defined for the cellular network and a second signal at a second one of the plurality of fixed operating bandwidths defined for the cellular network, wherein the first and second signals have a subcarrier overlap, the first signal includes at least one null subcarrier value and at least one non-null subcarrier value, and the second signal includes at least one null subcarrier value and at least one non-null subcarrier value; and
combining the first and second signals into a single signal that does not include the at least one null subcarrier value of the first signal and does not include the at least one null subcarrier value of the second signal.

2. The method of claim 1, wherein the at least one null subcarrier value of the first signal follows the at least one non-null subcarrier value of the first signal;
the at least one null subcarrier value of the second signal leads the at least one non-null subcarrier value of the second signal; and
combining the first and second signals into the single signal comprises using the at least one non-null subcarrier value of the first signal as leading subcarrier values of the single signal and using the at least one non-null subcarrier value of the second signal as trailing subcarrier values of the single signal that trail all of the leading subcarrier values.

3. The method of claim 2, further comprising, before combining the first and second signals into the single signal:

applying inverse fast Fourier transform ("IFFT") processing or fast Fourier transform ("FFT") processing to the first signal, and applying IFFT processing or FFT processing to the second signal.

4. The method of claim 1, wherein an error state occurs when the at least one null subcarrier value of the first signal leads the at least one non-null subcarrier value of the first signal and the at least one non-null subcarrier value of the second signal leads the at least one null subcarrier value of the second signal.

5. The method of claim 1, wherein the at least one non-null subcarrier value of the first signal overlaps the at least one null subcarrier value of the second signal; and the at least one non-null subcarrier value of the second signal overlaps the at least one null subcarrier value of the first signal.

6. The method of claim 1, further comprising, after combining the first and second signals into the single signal, applying inverse fast Fourier transform ("IFFT") processing or fast Fourier transform ("FFT") processing to the single signal.

7. The method of claim 1, wherein the single signal reflects a bandwidth that is not one of the plurality of fixed operating bandwidths defined for the cellular network.

8. The method of claim 1, further comprising performing a handshake between the first and second communication devices that establishes an understanding that the combining will be later performed.

9. The method of claim 1, further comprising detecting the subcarrier overlap using digital domain IQ data transmitted in a frequency domain of each of the first and second signals and using symbol duration transmitted in a time domain of each of the first and second signals;

wherein the detecting facilitate the combining of the first and second signals into the single signal.

10. The method of claim 1, wherein one of the first and second communication devices includes a distributed unit, and the other of the first and second communication devices includes a radio unit.

11. The method of claim 10, wherein the first communication device that receives the first and second signals includes the distributed unit, and the second communication device includes the radio unit such the communication is uplink communication.

12. The method of claim 10, wherein the first communication device that receives the first and second signals includes the radio unit, and the second communication device includes the distributed unit such that the communication is downlink communication.

13. The method of claim 10, wherein the first communication device performs the combining.

14. The method of claim 1, wherein the cellular network is a Third Generation Partnership Project ("3GPP") Long Term Evolution ("LTE") network.

15. The method of claim 1, wherein the cellular network is a 5G network.

16. The method of claim 15, wherein the single signal reflects a bandwidth that is not one of the plurality of fixed operating bandwidths defined for the network.

17. An apparatus, comprising:

at least one processor, and at least one non-transitory storage media storing instructions that, when executed by the at least one processor, cause the at least one processor to perform operations comprising:

receiving, at a first communication device in a cellular network from a second communication device in the cellular network, a first signal at a first one of a plurality of fixed operating bandwidths defined for the cellular network and a second signal at a second one of the plurality of fixed operating bandwidths defined for the cellular network, wherein the first and second signals have a subcarrier overlap, the first signal includes at least one null subcarrier value and at least one non-null subcarrier value, and the second signal includes at least one null subcarrier value and at least one non-null subcarrier value; and combining the first and second signals into a single signal that does not include the at least one null subcarrier value of the first signal and does not include the at least one null subcarrier value of the second signal.

18. At least one non-transitory storage media storing instructions that, when executed by at least one processor, cause the at least one processor to perform operations comprising:

receiving, at a first communication device in a cellular network from a second communication device in the cellular network, a first signal at a first one of a plurality of fixed operating bandwidths defined for the cellular network and a second signal at a second one of the plurality of fixed operating bandwidths defined for the cellular network, wherein the first and second signals have a subcarrier overlap, the first signal includes at least one null subcarrier value and at least one non-null subcarrier value, and the second signal includes at least one null subcarrier value and at least one non-null subcarrier value; and combining the first and second signals into a single signal that does not include the at least one null subcarrier value of the first signal and does not include the at least one null subcarrier value of the second signal.

* * * * *